(12) United States Patent  
Kamiya et al.

(10) Patent No.: US 7,419,074 B2
(45) Date of Patent: Sep. 2, 2008

(54) ROOF RACK

(75) Inventors: Tsuyoshi Kamiya, Anjo (JP); Hironori Koeda, Gifu (JP); Daiichi Shiraishi, Seto (JP); Kazuo Mori, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 154 days.

(21) Appl. No.: 10/712,379

(22) Filed: Nov. 14, 2003

(65) Prior Publication Data

US 2005/0051585 A1 Mar. 10, 2005

(30) Foreign Application Priority Data

Nov. 14, 2002 (JP) ............................. 2002-331020

(51) Int. Cl.
*B60R 9/00* (2006.01)

(52) U.S. Cl. ................. 224/321; 224/324; 224/330; 224/327; 224/315

(58) Field of Classification Search ............... 224/321, 224/324, 322, 323, 330, 327, 326, 515, 536, 224/558
See application file for complete search history.

(56) References Cited

U.S. PATENT DOCUMENTS

| 3,545,660 | A | * | 12/1970 | James ........................ 224/321 |
| 5,579,970 | A | * | 12/1996 | Cucheran et al. ............ 224/321 |
| 6,050,467 | A | * | 4/2000 | Drouillard et al. .......... 224/321 |
| 6,131,782 | A | * | 10/2000 | De Silva et al. ............. 224/321 |
| 6,296,161 | B1 | * | 10/2001 | Van der Feen et al. ...... 224/319 |
| 6,779,696 | B2 | * | 8/2004 | Aftanas et al. .............. 224/315 |

FOREIGN PATENT DOCUMENTS

JP 10-119657 12/1998

* cited by examiner

*Primary Examiner*—Nathan J Newhouse
*Assistant Examiner*—Lester L Vanterpool
(74) *Attorney, Agent, or Firm*—Finnegan, Henderson, Farabow, Garrett & Dunner, LLP.

(57) ABSTRACT

A roof rack includes a pair of roof rails extended in parallel each other and connected to a roof of a vehicle, a cross rail extended perpendicular to the roof rail for connecting the roof rails, and a stopper mechanism including a handle operable for fixing the cross rail to the roof rails. The cross rail is movable relative to the roof rail when the handle is at a first position and the cross rail is immovable relative to the roof rail when then handle is at a second position.

6 Claims, 5 Drawing Sheets

ROOF RACK

This application is based on and claims priority under 35 U.S.C. §119 with respect to Japanese Patent Application No. 2002-331020 filed on Nov. 14, 2002, the entire contents of which are incorporated herein by reference.

FIELD OF THE INVENTION

The present invention relates to a roof rack. More particularly, the present invention pertains to a roof rack for carrying a load on a roof of a vehicle.

BACKGROUND OF THE INVENTION

A known roof rack includes a pair of roof rails arranged in parallel each other to be fixed on a roof of a vehicle for extending in a longitudinal direction of the vehicle and a plurality of cross rails arranged to be perpendicular to the roof rails for connecting two roof rails for carrying a load. As described, for example, in Japanese Patent Laid-Open Publication No. H10-119657, the position of the cross rail is changeable for carrying the loads with different sizes and configurations with the known roof rack.

Notwithstanding, with the roof rack described in Japanese Patent Laid-Open Publication No. H10-119657, a user tightens screws by rotating an operational knob for fixing the cross rails to the roof rails. With this construction of the roof rack, the fixation is not uniform depending on the users. In case the tightening is loose, the noise due to the vibration is generated during the driving and the loading may be unstable when the heavy load is carried.

A need thus exists for a roof rack including a constant tightening force for fixing a cross rail to a roof rail for securely fixing them.

SUMMARY OF THE INVENTION

In light of the foregoing, the present invention includes a roof rack which includes a pair of roof rails extended in parallel each other and connected to a roof of a vehicle, a cross rail extended perpendicular to the roof rail for connecting the roof rails, and a stopper mechanism including a handle operable for fixing the cross rail to the roof rails. The cross rail is movable relative to the roof rail when the handle is at a first position and the cross rail is immovable relative to the roof rail when then handle is at a second position.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

One embodiment of the present invention will be explained with reference to drawing figures of the present invention.

Figure 1:
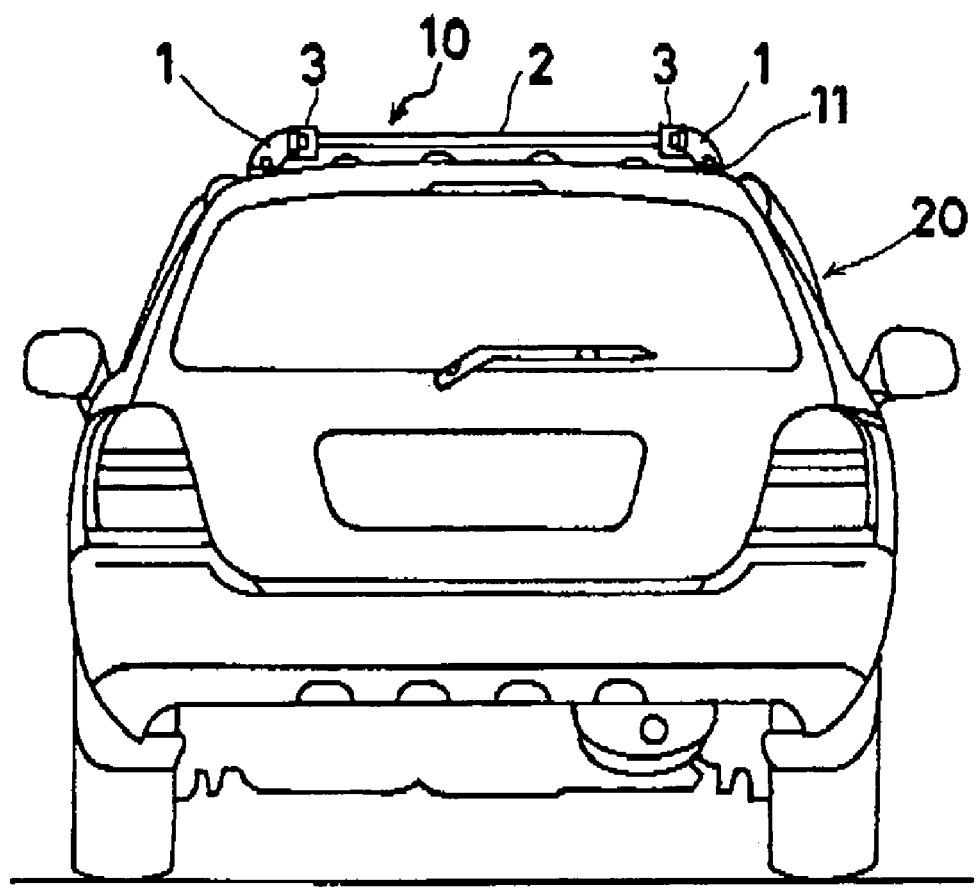
FIG. 1 shows a lateral view showing a state of a roof rack boarded on a vehicle according to an embodiment of the present invention.
Figure 3:
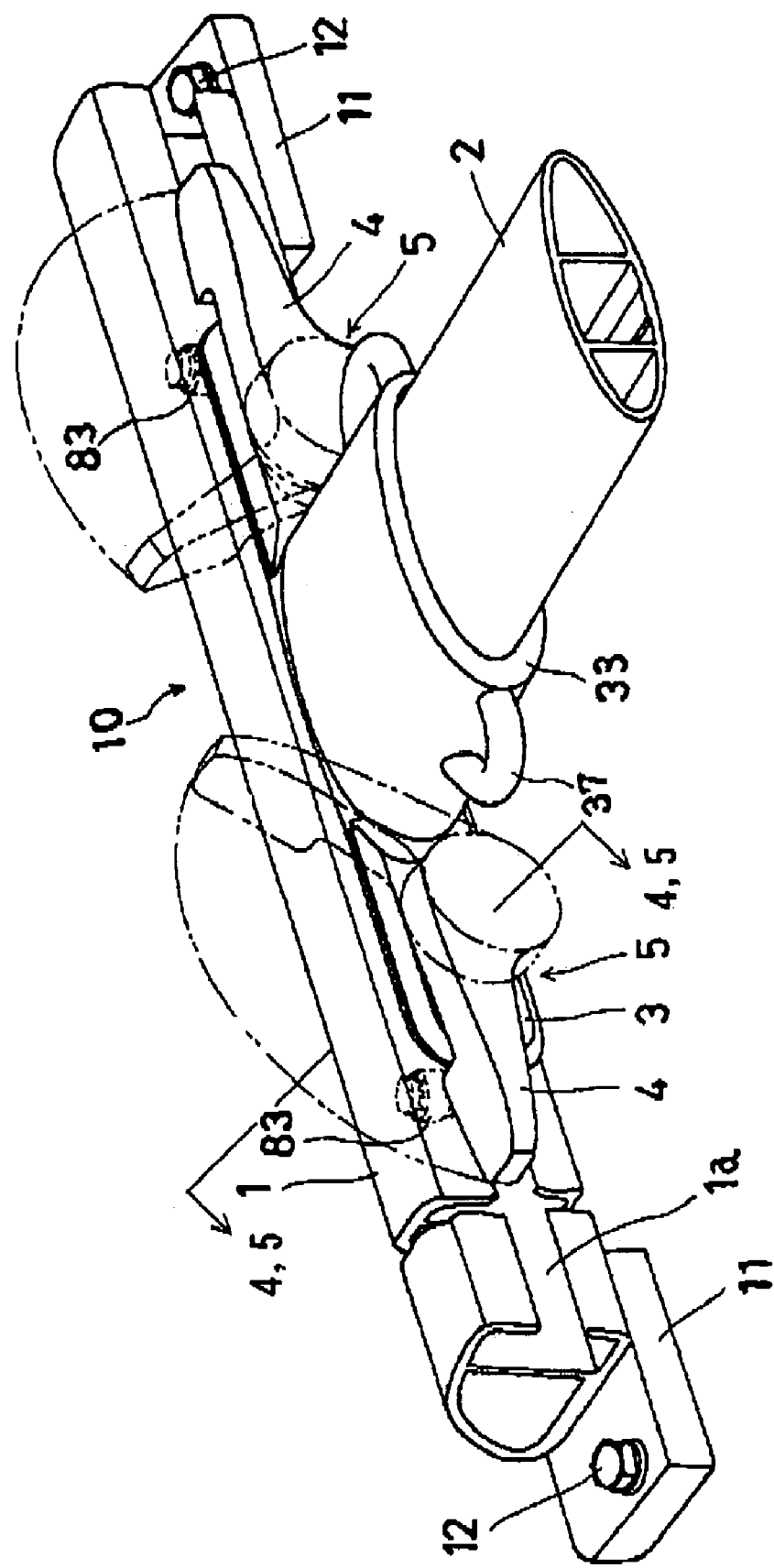
FIG. 3 is a partial enlarged perspective view of the roof rack according to the embodiment of the present invention.

As shown in FIGS. 1 and 3, a pair of roof rails 1 is arranged in parallel each other on a roof of a vehicle 20 in a longitudinal direction. The roof rails 1 are fixed to the roof with a screw means 12 via a base 11. The roof rail 1 may be made of aluminum and may be formed with a extrusion material to be configured as a long rail member with a constant cross section. The cross section includes an opening portion 1a (shown in FIG. 3) extended along the longitudinal direction of the roof rail 1. The opening portions 1a, 1a of two roof rails are positioned facing each other towards a central direction of the vehicle. Covers (not shown) are provided on each front, rear end portion of the roof rail 1 for the appearance.

Figure 2:
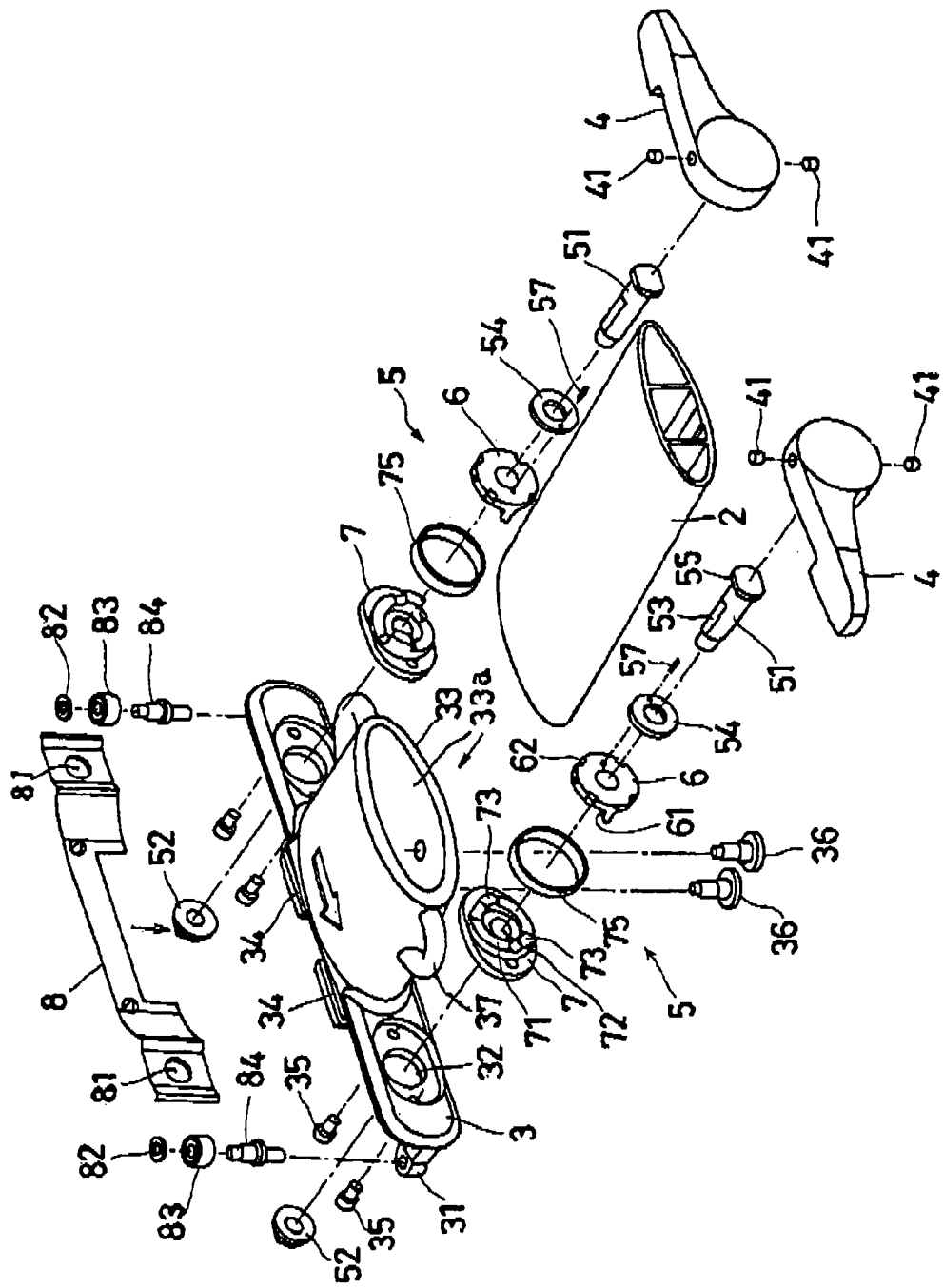
FIG. 2 is an exploded perspective view of a stopper mechanism of the roof rack according to the embodiment of the present invention.

As shown in FIGS. 2-3, a holder 3 is positioned contacting a lateral surface on the vehicle center side of the roof rail 1. The holder 3 includes arm portions 31 located in the roof rail 1 through the opening portion 1a. A pair of the arm portions is arranged at the front and the rear of the holder 3. A shaft 84 extended upward perpendicular to the arm portion 31 is fixed on each arm portion 31. A roller 83 is rotatably provided on the shaft 84 and a washer 82 is provided for preventing the dislocation of the roller 83. The holder 3 assumes movable in the longitudinal direction by the rotatable contact of the roller 83 at an internal surface of the roof rail 1 when an engagement of a stopper mechanism 5 is canceled.

As shown in FIGS. 2-3, the holder 3 includes a projection 33 including a horizontal hole 33a opening towards the center of the vehicle and located at the central portion of the holder 3 in the longitudinal direction. Each hole 33a of the holder 3 provided on right, left roll rails 1 are arranged to face each other. Each end portion of a cross rail 2 is fitted in the hole 33a to be fixed with a screw 36. A cross section of the hole 33a and the cross rail 2 are configured to be long in the longitudinal oval configuration. This configuration ensures the strength of the roof rack against the loading and reduces the noise due to the wind during driving the vehicle 20.

The plural cross rails 2 are arranged relative to the roof rail 1. The positions of each cross rail 2 are changed depending on the configuration and the size of the carrying load. The cross rails 2 may be engaged with the roof rail 1 by the stopper mechanism 5 changing the intervals of one another.

The construction of the stopper mechanisms 5 fixing the cross rail 2 to the roof rail 1 will be explained with reference to FIGS. 2 and 4-6. The stopper mechanisms 5 are provided on the front and the rear portions of the holder 3. The stopper mechanisms 5 provided on the front and the rear portions of the holder 3 include the identical constructions except the operational direction of a handle 4, which is symmetrical each other. Thus, the stopper mechanism 5 provided on one side will be explained as follows.

The stopper mechanism 5 includes a shaft 51. The shaft 51 extends horizontally in the width direction of the vehicle. One end of the shaft 51 is located in the roof rail 1 through the opening portion 1a from an outside of the roof rail 1. The shaft 51 also penetrates a hole 81 of a spring 8 positioned at a surface of the roof rail 1 to be tightened with a nut 52.

The spring 8 includes approximately the same length with the holder 3 in the longitudinal direction. The central portion of the spring 8 in the longitudinal direction is fitted in an attaching groove 34 formed on the holder 3 and inserted into the opening portion 1a of the roof rail 1 to be maintained. A rim portion of the opening portion 1a of the roof rail 1 is sandwiched between the holder 3 and the spring 8.

A portion of the shaft 51 located outside of the roof rail 1 penetrates holes provided at the central portion of each part arranged closer from the roof rail 1 including a hole 32 of the holder 3, a cam member 7, a collar 75, a contact member 6, and a spacer 54. Another end of the shaft 51 includes a head portion 55 formed with a diameter larger than the other end portion for preventing the dislocation of the parts relative to the shaft 51.

The cam member 7 is fixed to the holder 3 with a screw 35. A pair of opposing plane surface portions is formed at an internal surface of a hole 72 at the central portion of the cam member 7. Two plane surface portions 53 are formed on an external portion of the shaft 51 to be engaged with the plane surface potions of the cam member 7 so that the shaft 51 assumes movable in the axial direction relative to the cam member 7 and cannot be rotated relative to the cam member 7.

The contact member 6 is supported to be rotatable relative to the shaft 51 and movable in the axial direction of the shaft. Several concave portions 62 are formed on an external periphery of the contact portion 6. The handle 4 is provided for covering the external periphery of the contact member 6. Screws 41, 41 are provided for fixing the contact member 6 and the handle 4. Projections (not shown) fitting into the concave portions 62 of the contact member are provided on the handle 4 for unifying the handle 4 and the contact member 6. The contact member 6 includes a projection 61 extended in the rotational axis direction.

Figure 6:
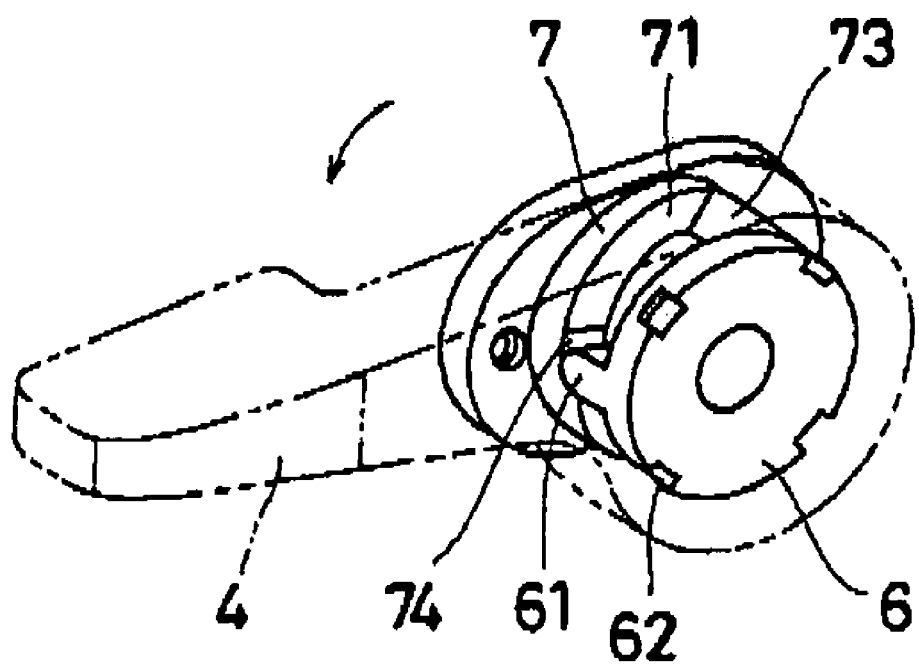
FIG. 6 is a perspective view of the stopper mechanism of the roof rack showing an engagement of a contact member and a cam member.

The cam member 7 includes a cam surface 71 to which a tip end of the projection portion 61 of the contact portion 6 contacts. The cam surface 71 is configured to approximate the cam member 7 and the contact member 6 or to separate the cam member 7 and the contact member 6 when the contact member 6 rotates relative to the cam member 7 with a slope. FIG. 6 shows a rotation state that the contact member 6 at the farthest position from the cam member 7.

Figure 4:
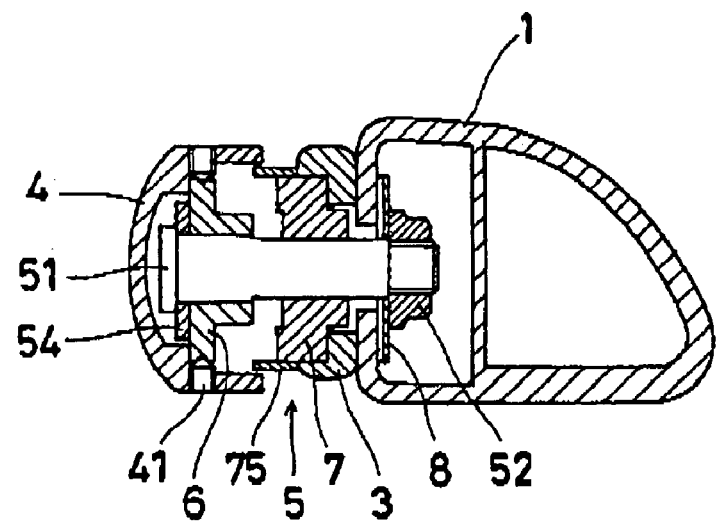
FIG. 4 is a cross-sectional view of the stopper mechanism at an engaged state taken on line IV-IV of FIG. 3.
Figure 5:
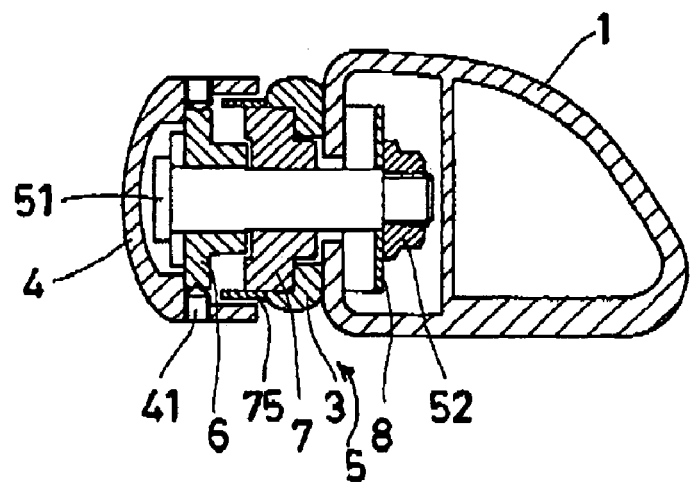
FIG. 5 is a cross-sectional view of the stopper mechanism at a non-engaged state taken on line V-V of FIG. 3.

As shown in FIGS. 4-5, the shaft 51 always pushes the contact member 6 to the cam member 7 by the biasing force of the spring 8. When the projection portion 61 moves from a lower side to a higher side of the cam surface 71 by rotating the handle 4, in other words, when rotating the contact member 6 in the stopping direction shown with an arrow in FIG. 6, the contact member 6 is separated from the cam member 7. When the contact member 6 is farthest rotated in the stopping direction to be the state as shown in FIG. 6, by pushing the head portion 55 of the shaft 51 via the collar 75 positioned at a back of the contact member 6, the spring 8 is pushed towards an internal surface of the roof rail 1 as shown in FIG. 4. In this case, the rim portion of the opening portion 1a of the roof rail 1 is sandwiched hard with the sprig 8 and the holder 3 so that the roof rail 1 with a strong frictional force stops the holder 3. The cam member 7 includes stopper portions 73 for defining the rotational range of the projection portion 61 on the both sides of the cam surface 71. A convex portion 74 is formed on the cam member 71 nearby the stopper portion 73 in the stopping direction. The convex portion 74 is configured to securely maintain the projection 61 at the stopping position and not to give the feeling of the wrongness at the operation of the handle 4 when the projection 61 gets over the convex portion 74.

The collar 54 is fixed to the projection portion 61 with a pin 57. The collar 75 for covering the clearance generated by the movement of the handle 4 in the rotational axis direction is fitted in the external periphery of the cam member 7. A hook portion 37 with a ring configuration is formed at the front and rear of the external periphery of the projection portion 33 of the holder 3. The hook portion 37 is used for tying a rope for fixing the load.

The operation of the roof rack 10 with the foregoing construction will be explained as follows. The user moves the cross rail 2 to a desired position while the stopper mechanism 5 is at a released state and the handle 4 is at a position shown with two dotted lines of FIG. 3. By rotating the handle 4 to a position shown with an actual line of FIG. 3 after determining the position of the cross rail 2, the stopper mechanism 5 engages the cross rail 2 to the roof rail 1.

With the roof rack 10 including the stopper mechanism 5 with the foregoing construction and operation, the tightening force assumes constant because the engagement between the cross rail and the roof rail is achieved only by rotating the handle 4 to a predetermined position. Thus, the cross rail 2 can be securely fixed with the sufficient tightening force so that the load is stably fixed.

According to the embodiment of the present invention, the cross rail is strongly fixed to the roof rail at a predetermined second position of the operation handle without changing the fixed state depending on the users.

According to the embodiment of the present invention, the stopper mechanism is constructed with a simple construction with smaller number of the parts.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof rack comprising:

a pair of roof rails extended in parallel each other and connected to a roof of a vehicle;

a cross rail for connecting the roof rails;

a stopper mechanism including a handle operable for fixing the cross rail to the roof rails, the stopper mechanism comprising a cam member having a projection portion and a contact member, said cam member having a convex portion configured to maintain the projection portion at a stopping position;

wherein the cross rail is movable relative to the roof rail when the handle is at a first position and the cross rail is immovable relative to the roof rail when then handle is at a second position;

a spring fitted in an attaching groove formed on a holder and inserted into an opening portion of the roof rail to be maintained and a rim portion of the opening portion of the roof rail is sandwiched between the holder and the spring;

and wherein the roof rails compressively contact the holder movable relative to the roof rails upon movement of the contact member relative to the cam member directly generated by engagement of the projection portion with the convex portion until reaching the stopping position when the handle is at the second position, and a shaft penetrates holes provided at the central portion of the cam member and the contact member.

2. The roof rack according to claim 1, wherein the roof rails compressively contact by the movement of the contact member when the handle is at the second position.

3. The roof rack according to claim 1, wherein the holder is compressively contacted with the roof rails by the cam member when the handle is at the second position.

4. A roof rack comprising:

a pair of roof rails extended in parallel to each other and connected to a roof of a vehicle;

a cross rail for connecting the roof rails; and a stopper mechanism including a handle operable for fixing the cross rail to the roof rails, the stopper mechanism comprising a cam member having a convex portion and a contact member having a projection portion for engaging the convex portion rotatably until reaching a stopping position;

wherein the cross rail is movable relative to the roof rail when the handle is at a first position and the cross rail is immovable relative to the roof rail when the handle is at a second position;

and wherein the roof rails compressively contact a holder movable relative to the roof rails upon movement of the contact member relative to the cam member directly generated by engagement of the projection portion with the convex portion until reaching the stopping position when the handle is at the second position, and a shaft penetrates holes provided through central portions of the cam member and the contact member.

5. The roof rack according to claim 4, wherein the roof rails compressively contact by the movement of the contact member when the handle is at the second position.

6. The roof rack according to claim 4, wherein the holder is compressively contacted with the roof rails by the cam member when the handle is at the second position.

* * * * *